(12) United States Patent  
Sah et al.

(10) Patent No.: US 8,494,702 B2
(45) Date of Patent: Jul. 23, 2013

(54) METHOD AND DRIVELINE STABILITY CONTROL SYSTEM FOR A VEHICLE

(75) Inventors: Jy-Jen F. Sah, West Bloomfield, MI (US); Robert L. Morris, Milford, MI (US); Ali K. Naqvi, White Lake, MI (US); Pinaki Gupta, Wixom, MI (US); Alexander K. Rustoni, Oxford, MI (US)

(73) Assignee: GM Global Technology Operations LLC, Detroit, MI (US)

(*) Notice: Subject to any disclaimer, the term of this patent is extended or adjusted under 35 U.S.C. 154(b) by 156 days.

(21) Appl. No.: 13/024,407

(22) Filed: Feb. 10, 2011

(65) Prior Publication Data

US 2012/0089281 A1 Apr. 12, 2012

Related U.S. Application Data

(60) Provisional application No. 61/390,353, filed on Oct. 6, 2010.

(51) Int. Cl.
*G06F 7/00* (2006.01)
(52) U.S. Cl.
USPC .......................................................... 701/22
(58) Field of Classification Search
USPC .......................................................... 701/22
See application file for complete search history.

(56) References Cited

U.S. PATENT DOCUMENTS 7,871,348 B2 1/2011 Perkins
2006/0131085 A1* 6/2006 Tamai ......................... 180/65.2

FOREIGN PATENT DOCUMENTS

| DE | 3605600 | * | 8/1987 |
| DE | 19720716 A1 | | 1/1998 |
| DE | 19746634 A1 | | 4/1998 |
| DE | 102007037209 A1 | | 3/2008 |
| DE | 102008061367 A1 | | 7/2009 |
| GB | 2441423 A | | 3/2008 |

* cited by examiner

*Primary Examiner* — Thomas Tarcza
*Assistant Examiner* — Maceeh Anwari
(74) *Attorney, Agent, or Firm* — Quinn Law Group, PLLC

(57) ABSTRACT

A method for controlling driveline stability in a vehicle includes generating an activation signal indicative of a predetermined vehicle maneuver, which may include a hard braking maneuver on a low coefficient of friction surface. A quick automatic shift to a neutral gear state is executed with a rapid dumping or bleeding off of clutch pressure in a designated output clutch of the vehicle. An activated state of an antilock braking system (ABS) may be used as part of the activation signal. The shift to the neutral gear state may occur only when a current transmission operating state is associated with the high level of driveline inertia. A vehicle includes a transmission and a control system configured to execute the above method.

12 Claims, 2 Drawing Sheets

METHOD AND DRIVELINE STABILITY CONTROL SYSTEM FOR A VEHICLE

CROSS-REFERENCE TO RELATED APPLICATIONS

This application claims priority to and the benefit of U.S. Provisional Patent Application Ser. No. 61/390,353, which was filed on Oct. 6, 2010, and which is hereby incorporated by reference in its entirety.

TECHNICAL FIELD

The present invention relates to a method and driveline stability control system for a vehicle.

BACKGROUND

Vehicles can experience driveline vibrations or oscillations during certain driving maneuvers. Such driveline oscillations may appear more frequently in vehicles lacking a hydrodynamic torque converter or another suitable driveline damping mechanism. This is typically the case in a hybrid electric vehicle. Active driveline damping can be automatically applied in some embodiments of such a vehicle in order to help reduce the severity of driveline oscillations.

The drive wheels of a vehicle can lock up during certain vehicle maneuvers, for example when executing a hard braking maneuver on a low-friction surface. This in turn can trigger a state activation in an antilock braking system (ABS) controller. To unlock the drive wheels, the active ABS controller automatically commands a set of high frequency brake pressure pulsations. However, the active ABS state and related braking control actions are a further load on the driveline, and may exacerbate the severity of any existing driveline oscillations.

SUMMARY

A method is disclosed herein for controlling driveline stability in a vehicle. The method includes generating an activation signal in response to a predetermined vehicle maneuver, which is a threshold hard braking maneuver on a surface having a threshold low coefficient of friction. The method also includes using a control system to automatically execute, in response to the activation signal, a quick shift to a neutral gear state in conjunction with a rapid uncontrolled dumping or bleeding off of clutch pressure in a designated output clutch of the vehicle.

A vehicle as set forth herein includes a transmission and a control system, which controls driveline stability during the predetermined vehicle maneuver in response to an activation signal. The control system is configured for automatically executing a quick shift of the transmission to a neutral gear state, thereby controlling driveline stability of the vehicle during the predetermined vehicle maneuver.

The above features and advantages, and other features and advantages of the present invention are readily apparent from the following detailed description of the best modes for carrying out the invention when taken in connection with the accompanying drawings.

DETAILED DESCRIPTION

Figure 1:
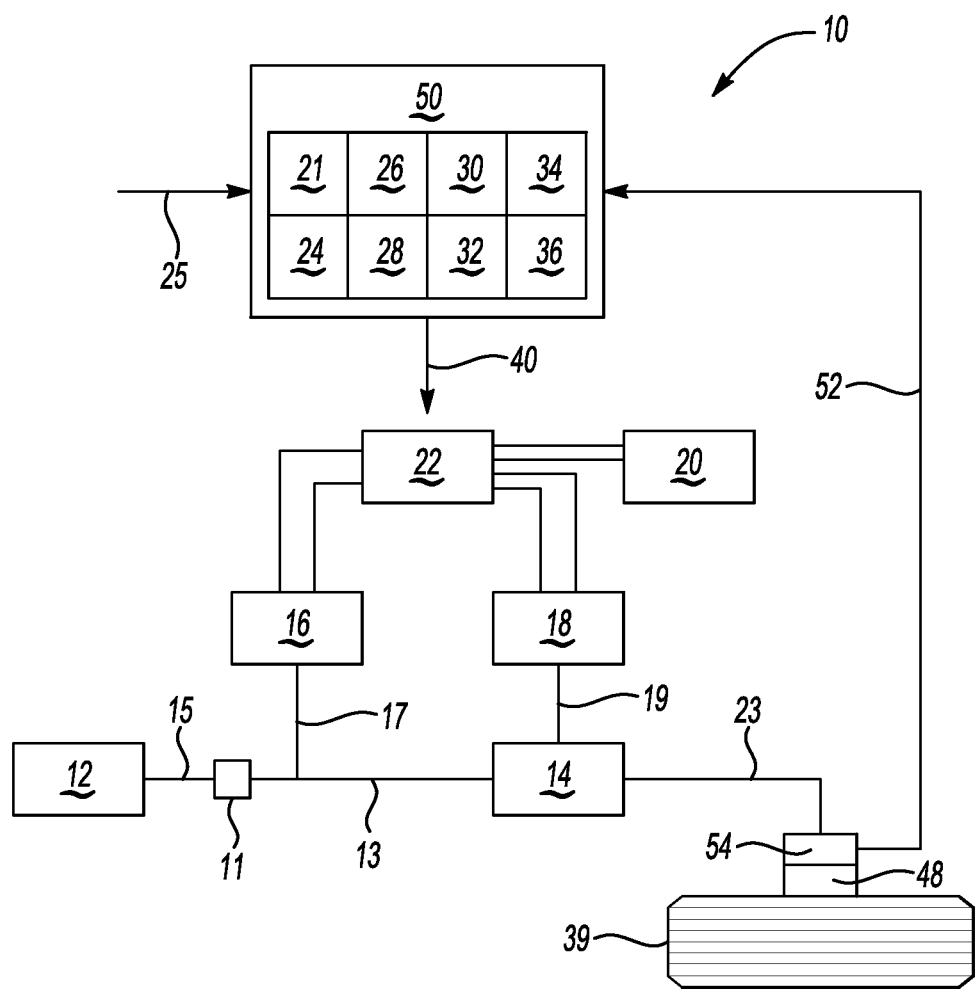
FIG. 1 is a schematic illustration of a vehicle having a control system which executes the present control method during a predetermined vehicle maneuver.

A vehicle 10 is shown in FIG. 1. The vehicle 10 includes a distributed control system 50, which is configured to selectively control driveline stability during a predetermined vehicle maneuver. The control system 50 does so by executing a method 100 via control signals (arrow 40). The method 100 is executed in response to an activation signal (arrow 25) indicating a detected presence of the predetermined vehicle maneuver, as explained below. The control signals 40 are automatically generated and/or processed by various portions of the control system 50.

Figure 2:
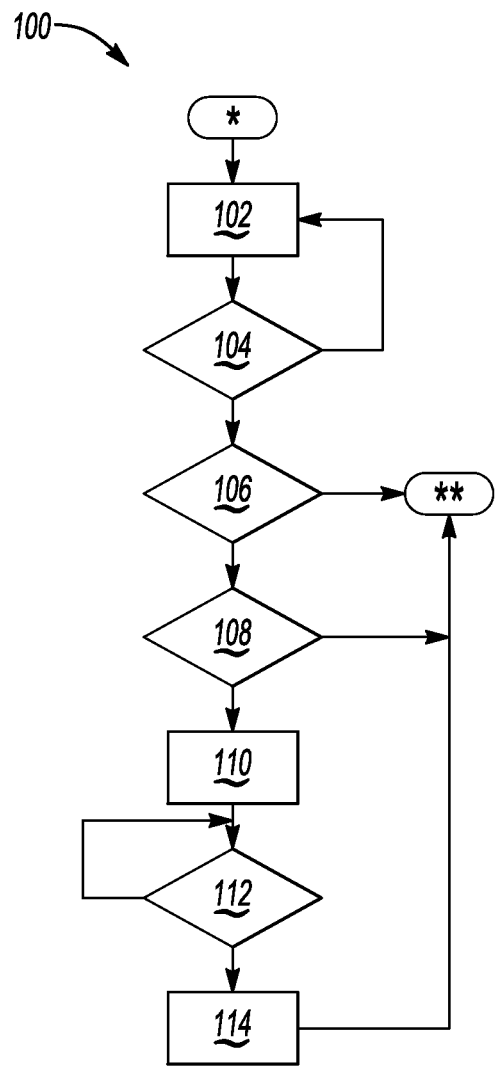
FIG. 2 is a flow chart describing a method for controlling driveline oscillations aboard the vehicle shown in FIG. 1 during the predetermined vehicle maneuver.

The predetermined vehicle maneuver may be any vehicle event triggering an activation of an antilock braking system (ABS) controller 21, or triggering equivalent ABS capabilities resident in another control module. For example, a threshold hard braking maneuver may be used as the predetermined vehicle maneuver, wherein the vehicle 10 brakes hard on a road surface having a low coefficient of friction ($\mu$), i.e., a low-$\mu$ surface. Typical low-$\mu$ surfaces that might be encountered include wet, icy, oily, or gravel-coated road surfaces. The present method 100 is shown in FIG. 2, and includes the step of selectively executing a quick shift through a neutral gear state as an automatic transmission control action.

The vehicle 10 in the embodiment of FIG. 1 includes an internal combustion engine 12, a transmission 14, and a pair of high-voltage electric traction motors 16 and 18. Other vehicle embodiments may use a single traction motor. The transmission 14 can be selectively powered by the engine 12, the traction motor 16, the traction motor 18, or any combination thereof depending on the transmission operating mode or state, as determined by a shift control algorithm or logic (not shown). The vehicle 10 includes an energy storage system (ESS) 20, e.g., a rechargeable battery pack, which is electrically connected to the traction motors 16 and 18 via a traction power inverter module (TPIM) 22. The transmission 14 has multiple operating modes or states, each with an associated driveline inertia level. The control system 50 and its execution of method 100 can be selectively enabled or disabled as needed based on the particular control logic using calibrations.

The ESS 20 may be recharged during operation of the vehicle 10 via regenerative braking, and may be optionally recharged via an offboard power supply (not shown) when the vehicle is idle when configured as a plug-in hybrid electric vehicle. As understood in the art, a power inverter inverts electrical power from alternating current (AC) to direct current (DC), and vice versa, to enable use of a multi-phase AC permanent magnet or induction devices, i.e., the traction motors 16 and 18, with a DC battery, e.g., the ESS 20.

The control system 50 is used aboard the vehicle 10 to maintain control over the engine 12, the transmission 14, and each of the traction motors 16 and 18. The control signals (arrow 40) are communicated to the affected vehicle systems when needed, e.g., via a controller area network (CAN), serial bus, data routers, and/or other suitable means. The control system 50 may include as many different vehicle control modules as are required to maintain optimal control, including the ABS controller 21, a braking control module (BCM) 24, motor control processors (MCP) 26 and 28, a hybrid control module (HCM) 30, an engine control module (ECM) 32, and a battery or ESS control module 34. For simplicity and clarity, the control system 50 is represented in FIG. 1 as a single device, although separate controllers, either in functionality or in structure, may be used within the scope of the present invention.

The hardware components of the distributed control system 50 of FIG. 1 can include one or more digital computers each having a microprocessor or central processing unit, read only memory (ROM), random access memory (RAM), electrically-programmable read only memory (EPROM), a high-speed clock, analog-to-digital (A/D) and digital-to-analog (D/A) circuitry, and input/output circuitry and devices (I/O), as well as appropriate signal conditioning and buffer circuitry. Each set of algorithms or code resident in the control system 50 or readily accessible thereby, including any algorithms or computer code needed for executing the present method 100 as explained below with reference to FIG. 2, can be stored in tangible/non-transitory computer-readable memory 36, and executed by any host machine or other hardware portions of the control system 50 as needed to provide the disclosed functionality.

The engine 12 is capable of selectively generating a sufficient amount or level of engine torque for rotating a drive shaft 15. An input assembly 11 can be used to connect the engine 12 to an input member 13 of the transmission 14. The specific configuration of input assembly 11 can vary with the vehicle design. For example, the input assembly 11 may be a clutch and damper assembly that selectively connects and disconnects the engine 12 from the vehicle driveline as needed, or it can be a grounding clutch or brake that selectively brakes the drive shaft 15 when the engine is not running.

Each of the traction motors 16 and 18 has a respective motor output shaft 17 and 19. Thus, input torque to the transmission 14 may be generated and delivered by the engine 12 as engine torque and/or the traction motors 16, 18 as motor torque. Output torque from the transmission 14 can be delivered to a set of drive wheels 39 via an output member 23. The actual configuration of the transmission 14 can vary depending on the design of the vehicle 10, and may include one or more planetary gear sets, an electrically variable transmission, rotating clutches, braking clutches, hydraulic or electromechanical activation components, etc.

As noted above, the distributed control system 50 shown in FIG. 1 is configured to execute method 100 (see FIG. 2) to improve driveline stability, e.g., to reduce driveline oscillations, during a threshold vehicle maneuver in which the ABS controller 21 enters an active state. Such a maneuver may be embodied as a hard braking maneuver on a low-μ surface, wheel lock up upon hitting an obstacle such as a pothole, or any other event in which the ABS controller 21 becomes active. Wheel slip may be used as one possible way of determining such a maneuver, as understood in the art. Detection of the maneuver by any suitable means results in generation of the activation signal (arrow 25), whether from the ABS controller 21 or from another control module.

Major components of a typical ABS system include a wheel speed sensor 54 positioned in close proximity to each drive wheel 39, and any required hydraulic, electric, and/or electromechanical brake components 48. In one possible embodiment, the brake components 48 can include brake discs, calipers, drums, pads, rotors, etc., as understood in the art, as well as any fluid or electromechanical activation devices. The wheel speed sensors 54 collectively provide wheels speed signals (arrow 52) to the BCM 24. When any of the drive wheels 39 are approaching a locked state, the brake components 48 are automatically controlled to individually modulate the braking pressure applied at each wheel, thus preventing the wheels from locking up or unlocking any locked wheels.

The distributed control system 50 shown in FIG. 1 can also receive and process various other input signals, including but not limited to output torque and rotational speed of the engine 12, motor torque, torque direction, and rotational speed of the traction motors 16 and 18, throttle or accelerator position, etc. The control system 50, and in particular the HCM 30, then achieves a targeted gear ratio or transmission operating mode or state in the most efficient manner by coordinating engine speed and motor speeds in a manner that is dependent upon the current transmission operating strategy.

Referring to FIG. 2, the present method 100 may be embodied on tangible media as computer-executable code and automatically executed by the control system 50 of FIG. 1 to address the condition in which the predetermined vehicle maneuver causes the wheels 39 to lock up, which may in turn activate the ABS controller 21. Heavy motor inertia complicates the ability of any ABS-related portions of the distributed control system 50 to unlock the wheels 39. The method 100 is therefore executed to reduce the severity of driveline oscillations during such a vehicle maneuver.

Beginning with step 102, and referring to the structure of the vehicle 10 shown in FIG. 1 and explained above, the control system 50 collects a preliminary set of vehicle information. Step 102 may include processing braking signals, vehicle speed, wheel speeds or slip via the wheel speed signals 52, determining the activation state of the ABS controller 21, transmission output speed, etc. The method 100 then proceeds to step 104.

At step 104, the control system 50 determines whether or not the information collected at step 102 corresponds to a predetermined vehicle maneuver, such as a threshold hard braking maneuver executed on a low-μ surface. Step 104 may take place in the BCM 24 or other suitable control module, and may include comparing information from step 102 to calibrated thresholds. Other factors that could be evaluated at step 104 include a rapid deceleration of the input member 13 of the transmission 14 in conjunction with a vehicle speed and/or wheel speeds that remain relatively constant, within a calibrated range, or that do not otherwise decrease at a rate that would be indicated by such rapid braking.

If the predetermined vehicle maneuver is not detected at step 104, the method 100 repeats step 102. Otherwise, the method 100 includes passing the results of step 104 to the HCM 30 from the BCM 24 or other control module, if used, over a serial data link or other suitable high-speed communications channel. The method 100 then proceeds with step 106.

At step 106, the HCM 30 determines whether there is a negligible amount of driver intended axle torque request indicating that the driver of the vehicle 10 uses a conventional one-footed driving technique. That is, in a normal driving maneuver a driver first lifts a preferred driving foot, usually the driver's right foot, from the accelerator pedal (not shown) before using the same foot to depress the brake pedal. Thus, there is a negligible amount of driver intended axle torque request in the conventional one-footed driving technique, as the foot applying such a request no longer rests on the accelerator pedal.

However, some drivers prefer to use one foot to control the accelerator pedal and the other foot to control the brake pedal, thus running the risk of simultaneously depressing the accelerator pedal and the brake pedal. The amount of driver intended axle torque request in this instance may be significant. The method 100 proceeds to step 108 if there is less than a threshold amount of driver intended axle torque request, i.e., a negligible amount of driver intended axle torque request. Otherwise, the method is finished.

At step 108, the HCP 30 delays for a calibrated interval to mature the signal from step 108. The HCM 30 then looks at the current transmission operating mode or state to determine if the mode or state, in light of the present vehicle conditions such as input speed, output speed, wheel speed, etc., is associated with a high level of driveline inertia. For example, lower gears are typically associated with lower inertia levels. The terms "low" and "high" are therefore relative, and may be determined relative to calibration values and/or the present mode or state. If the current transmission operating mode is associated with a high level of inertia, the method 100 proceeds to step 110. Otherwise, the method 100 is finished.

At step 110, the HCM 30 initiates a predetermined neutral shift event. As used herein, the neutral shift event refers to a quick shift to a neutral gear state coupled with a rapid uncontrolled dumping or bleeding off of clutch pressure in any designated output clutches of the transmission 14 identified by the control system 50 as being used during the neutral shift. Identification of the designated output clutch(es) may be included within step 110 or executed as a separate step. The method 100 then proceeds to step 112.

At step 112, the HCM 30 determines if the present state of the ABS controller 21 or of any other ABS functionality remains active. If so, the method 100 remains at step 112, effectively remaining in the neutral state until the ABS state is inactive. When the ABS state becomes inactive, the method 100 proceeds to step 114.

At step 114, the HCM 30 shifts back out of neutral to a drive state, as indicated by the HCM. Method 100 is finished.

While the best modes for carrying out the invention have been described in detail, those familiar with the art to which this invention relates will recognize various alternative designs and embodiments for practicing the invention within the scope of the appended claims.

The invention claimed is:

1. A method for controlling driveline stability in a hybrid electric vehicle having an automatic transmission and a control system, the method comprising:
   determining whether a current transmission operating state of the transmission corresponds to a threshold high level of driveline inertia, including processing, via the control system, an input speed and an output speed of the transmission;
   generating an activation signal in response to a predetermined vehicle maneuver, wherein the predetermined vehicle maneuver includes a threshold hard braking maneuver on a surface having a threshold low coefficient of friction; and
   automatically executing, via the control system in response to the activation signal only when the current transmission operating state corresponds to the threshold high level of driveline inertia and an amount of driver intended axle torque is zero, a quick shift to a neutral gear state, including rapidly dumping or bleeding off a clutch pressure in a designated output clutch of the transmission.

2. The method of claim 1, wherein the control system includes an anti-lock braking system (ABS) controller, the method further comprising:
   generating the activation signal at least partially in response to detecting an active state of the ABS controller.

3. The method of claim 2, further comprising:
   automatically shifting out of the neutral gear state via the control system when the ABS controller is no longer in the active state.

4. The method of claim 1, wherein the control system includes a braking control module (BCM), a plurality of drive wheels, and an equal plurality of wheel speed sensors, and wherein detecting a predetermined vehicle maneuver includes calculating, via the BCM, a slip speed of each of the drive wheels using speed signals from the wheel speed sensors.

5. A hybrid electric vehicle comprising:
   an automatic transmission ; and
   a control system which controls driveline stability during a predetermined vehicle maneuver in response to an activation signal, wherein the predetermined vehicle maneuver is a threshold hard braking maneuver on a surface having a low coefficient of friction;
   wherein the control system is configured to:
      determine whether a current transmission operating state of the transmission corresponds to a threshold high level of driveline inertia, including processing, via the control system, an input speed and an output speed of the transmission; and
      automatically execute, in response to the activation signal only when the current transmission operating state corresponds to the threshold high level of driveline inertia and an amount of driver intended axle torque is zero, a quick shift to a neutral gear state, including a rapid dumping or bleeding off of a clutch pressure in a designated output clutch of the transmission.

6. The vehicle of claim 5, wherein the control system includes an anti-lock braking system (ABS) controller, and initiates the shift through the neutral gear state only when the ABS controller is in an active state.

7. The vehicle of claim 5, wherein the control system includes each of a braking control module (BCM) configured for detecting the predetermined vehicle maneuver and a hybrid control module (HCM) configured for initiating the shift to and from the neutral gear state.

8. The vehicle of claim 5, further comprising a plurality of wheel speed sensors, wherein the control system is configured for detecting the predetermined vehicle maneuver at least in part by processing speed signals from the wheel speed sensors.

9. A method for controlling driveline stability in a hybrid electric vehicle having a transmission and a control system and characterized by an absence of a torque converter or a driveline damping mechanism, the method comprising:
   measuring a slip speed of a set of drive wheels of the vehicle;
   measuring an amount of driver-intended braking force;
   determining, via the control system, whether the slip speed and the amount of driver-intended braking force correspond to a predetermined vehicle maneuver, wherein the predetermined vehicle maneuver is a threshold hard braking maneuver on a surface having a low coefficient of friction;
   determining whether a current transmission operating state of the transmission corresponds to a threshold high level of driveline inertia, including processing, via the control system, an input speed and an output speed of the transmission; and
   generating an activation signal when the control system determines the presence of the predetermined vehicle maneuver; and
   automatically executing a quick shift to a neutral gear state via the control system in response to the activation signal only when the current transmission operating state corresponds to the threshold high level of driveline inertia and an amount of driver intended axle torque request is zero during the predetermined vehicle maneuver, including executing a rapid dumping or bleeding off of a clutch pressure in a designated output clutch of the transmission.

10. The method of claim 9, wherein the control system includes an anti-lock braking system (ABS) controller, the method further comprising:
generating the activation signal at least partially in response to detecting an active state of the ABS controller.

11. The method of claim 9, further comprising:
automatically shifting out of the neutral gear state via the control system when the ABS controller is no longer in the active state.

12. The method of claim 9, wherein the control system includes a braking control module (BCM) configured for detecting the predetermined vehicle maneuver and a hybrid control module (HCM) configured for initiating the quick shift to the neutral gear state.

* * * * *